United States Patent [19]

Falkenburg et al.

[11] 4,391,965

[45] Jul. 5, 1983

[54] CURING AGENTS

[75] Inventors: Hans R. Falkenburg, Haan; Siegfried Krause, Mettmann; Robert C. McGuiness, Erkrath, all of Fed. Rep. of Germany

[73] Assignees: Imperial Chemical Industries PLC, London, England; Hermann Wiederhold G.m.b.H. Corp., Hilden, Fed. Rep. of Germany

[21] Appl. No.: 315,264

[22] Filed: Oct. 26, 1981

[30] Foreign Application Priority Data

Oct. 27, 1980 [DE] Fed. Rep. of Germany ....... 8034534

[51] Int. Cl.³ ............................................ C08G 59/42
[52] U.S. Cl. .................................... 528/112; 428/418; 528/115; 528/365; 427/386
[58] Field of Search ....................... 528/112, 115, 365; 560/52, 76, 98; 428/418

[56] References Cited

U.S. PATENT DOCUMENTS

| 3,183,248 | 5/1965 | Hirsch et al. | 528/112 X |
| 3,555,111 | 1/1971 | Benham | 528/110 X |
| 4,101,518 | 7/1978 | Takamori et al. | 528/112 X |
| 4,208,488 | 6/1980 | Kraft et al. | 528/112 X |
| 4,226,755 | 10/1980 | Knecht | 528/110 X |

Primary Examiner—Earl A. Nielsen
Attorney, Agent, or Firm—Cushman, Darby & Cushman

[57] ABSTRACT

A modified polycarboxylic acid polyanhydride curing agent suitable for curing epoxy resins which is prepared by reacting a polycarboxylic acid anhydride with a monohydroxy compound ROH; and coating compositions, comprising the modified curing agent and a solution of an epoxy resin to be cured, which have improved storage stability.

9 Claims, No Drawings

CURING AGENTS

This invention relates to improved curing agents and to their use in coating compositions, more particularly to improved curing agents which are based on polycarboxylic acid polyanhydrides and to their use in coating compositions which comprise an epoxy resin.

Acid anhydrides are well known as curing agents (or "hardeners") for epoxy resins, particularly where stability of the product at high temperatures is required. They have found important application in the formulation of powder coatings and in laminating and other "bulk" polymerisation processes where it is not necessary for the reactants to be dissolved in an organic solvent. In general the acid anhydrides which are useful as curing agents for epoxy resins have poor solubility in those organic solvents in which the epoxy resins are soluble and in organic solvents which are suitable for example with respect to toxicity and cost, in formulating solvent-borne coating compositions. Therefore, the anhydrides which are solids at ambient temperatures, as opposed to those which are liquids, have found limited use hitherto in solvent-borne coating compositions.

Where it has been desired that an acid anhydride curing agent shall produce a high level of crosslinking in a cured product, for example in a coating derived from a powder coating composition, there has been used a polyanhydride, for example a dianhydride such as a condensation product of trimellitic anhydride and a polyol. The useful polyanhydrides, as indicated above, have a low solubility in the solvents which are suitable in formulating coating compositions comprising an epoxy resin. Therefore, if they are to be used in solvent-borne coating compositions, they are frequently present initially as a dispersion or "paste" in an organic liquid which is mixed with a solution of an epoxy resin in the same or a similar organic liquid some time before the resulting coating composition is applied to a substrate.

Disadvantages of the use of a dispersion of the polyanhydride are for example: (1) the coating composition may be initially inhomogeneous and of gradually changing character; and (2) depending upon the particular polyanhydride, the mixture may remain inhomogeneous, making impossible the formulation of a completely soluble product.

Moreover, it is found that in those cases where a solvent-soluble coating composition comprising a mixture of a solution of an epoxy resin and the dispersion of a polyanhydride in an organic liquid (as discussed above) can be made, this has a relatively short storage life; e.g. after 8 days at 40° C. one composition is unsuitable for practical use and after 17 days at 40° C. the same composition has gelled.

We have now found that a polyanhydride curing agent as herein defined can be modified, so as to produce an improved curing agent suitable for subsequent use with a solution of an epoxy resin to be cured, by taking a deliberate step to cause reaction between the polyanhydride and a monohydroxy compound ROH, also herein defined, and by producing a solution of the reaction product in said compound, and/or in one or more organic liquids which is/are miscible with the solvent for the epoxy resin to be cured. It is believed (see Kirk-Othmer, Encyclopedia of Polymer Chemistry. Epoxy Resins, p. 230 Acid Curing Agents) that, in the mechanism of curing an epoxy resin by an acid anhydride, at elevated temperature the anhydride first reacts with a hydroxyl group, which is very often present in the epoxy resin, to cause ring-opening of the anhydride; and that the resulting carboxyl group derived from the anhydride reacts with an epoxy group to yield a new hydroxyl group. It is, therefore, very surprising—bearing in mind the fact that the anhydrides are more effective curing agents than are the free acids—that we find advantage in prereacting the anhydride group before it is brought into contact with the epoxy resin.

Thus, according to one aspect of this invention we provide a new curing agent suitable for use in combination with a solution of an epoxy resin to be cured comprising the product which results by taking a deliberate step to cause reaction between an acid polyanhydride curing agent as herein defined and a monohydroxy compound ROH as herein defined.

Preferably the new curing agent also comprises one or more organic liquids which are miscible with the solution of an epoxy resin to be cured.

This invention also provides a coating composition which comprises in admixture:

(a) the new curing agent which is defined above, and
(b) a solution of an epoxy resin (as herein defined) which is to be cured.

This invention further provides a coating on a substrate which is prepared by applying to the substrate a coating composition as defined above and thereafter heating the substrate to a temperature greater than 100° C.

By a polyanhydride curing agent we mean a substance which is known conventionally as a curing agent for an epoxy resin and which comprises a compound having two or more dicarboxylic acid anhydride groups

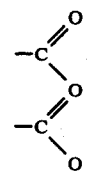

which each form part of a five-membered ring. There may be present in the substance more than one pure chemical compound, for example two or more compounds each having two or more dicarboxylic acid anhydride groups; or a mixture of such a compound or compounds together with compounds which do not contain two or more dicarboxylic anhydride groups for example compounds which contain only one anhydride group, free carboxylic groups, or ester groups.

Suitable polyanhydrides include the trimellitic anhydride adducts of the general formula:

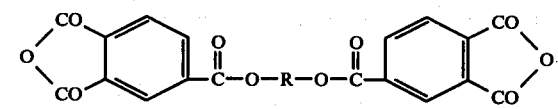

wherein R is a hydrocarbon radical, preferably having from 2 to 12 carbon atoms, and wherein the aromatic nuclei may be substituted with one or more halogen atoms and/or one or more hydrocarbyl groups. Particularly suitable adducts are the trimellitic anhydride-polyhydric alcohol adducts, preferably an adduct of a glycol such as ethylene glycol, and especially the adduct

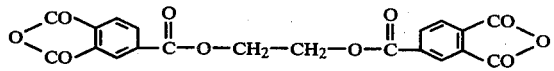

Other suitable polyanhydrides include the benzophenone tetracarboxylic dianhydrides of the formula:

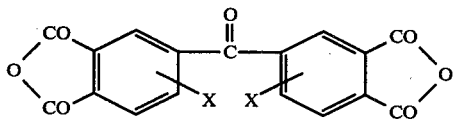

wherein X represents hydrogen, halogen, —NO$_2$, —COOH, or —SO$_3$H and may be the same or different radicals. Examples of benzophenone tetracarboxylic dianhydrides include 3,3',4,4'-benzophenone tetracarboxylic dianhydride; 2-bromo-3,3',4,4'-benzophenone tetracarboxylic dianhydride; and 5-nitro-3,3',4,4'-benzophenone tetracarboxylic dianhydride.

Other polyanhydrides which may be used are the polyfunctional cyclic anhydrides. Among these, are cyclopentane tetracarboxylic acid dianhydride, diphenylether tetracarboxylic acid dianhydride, the hexacarboxylic acid trianhydrides of benzene, and of cyclohexane, and 1,2,3,4-butane tetracarboxylic dianhydride.

Some commercially available polyanhydride curing agents are mixtures of two or more compounds, which result from the condensation of two or more compounds at least one of which is polyfunctional; for example, from the condensation of a diol or triol e.g. ethylene glycol or glycerol with trimellitic anhydride.

By a compound ROH we mean a compound which will react with a dicarboxylic acid anhydride group, as exemplified by phthalic anhydride to form an ester. The group R may be for example $C_{1-18}$ alkyl, substituted alkyl or aralkyl. Typical alkyl substituents include ether groups and ester groups.

Examples of suitable compounds ROH include alkanols such as butanol, isobutanol, hexanol, octanol and dodecanol; etheralkanols such as the monoethyl ethers of ethylene glycol; and hydroxyesters such as butyl glycolate. The choice of a suitable compound ROH will of course depend upon the nature, for example the reactivity, of the polyanhydride with which it is to be specifically reacted. Preferably the compound ROH is a liquid.

Examples of organic liquids which are suitable solvents for epoxy resins when used in coating compositions and which may therefore be used, optionally in conjunction with the compound ROH, to produce a solution of the curing agent of this invention include ester solvents such as 2-ethoxyethyl acetate, 2-methoxyethyl acetate, 2-isopropoxyethyl acetate, butyl acetate; ketone solvents such as methyl ethyl ketone, methyl isobutyl ketone; ether solvents; and aromatic solvents such as xylene.

The new curing agent of this invention is prepared by taking a deliberate step to cause reaction between the polyanhydride and the compound ROH. Preferably there is taken the deliberate step of promoting the reaction at an elevated temperature, for example at a temperature greater than ambient and more preferably at greater than 60° C., for such a period of time that a substantial proportion of the polyanhydride groups are reacted with the compound ROH. There is employed from 0.5 to 5.0, and more preferably 0.5 to 2.0, equivalents of ROH for each anhydride group of the polyanhydride.

We believe, but the scope of our invention is not to be interpreted or limited in the light of this belief, that there is produced as the novel curing agent a partial ester of the polyanhydride and the compound ROH and that it is essential for complete success that at least 50% and preferably at least 75% of the anhydride groups of the polyanhydride are reacted with the compound ROH. This is to be distinguished from any other circumstances where, for example at ambient temperature, the polyanhydride is merely mixed with a compound ROH as a solvent and esterification either does not take place or is of little consequence. We believe that a partial and deliberate esterification using the compound ROH may be responsible for the improved stability of a mixture of a solution of the curing agent of this invention together with a solution of an epoxy resin, as compared with the relative instability of a mixture of the polyanhydride precursor of our curing agent together with a solution of the epoxy resin.

The coating compositions of this invention may contain any of the conventional additives such as flow agents, accelerators and pigments.

The invention is illustrated by the following Examples in which parts are by weight.

EXAMPLE 1

This Example illustrates the advantageous effect on storage stability (as indicated by the variation of viscosity with time) of deliberately reacting with a conventional commercially available polyanhydride curing agent a monohydroxy compound ROH, butyl glycolate, before it is mixed with a solution of an epoxy resin.

A commercially available polyanhydride curing agent, "Epikure" F-50 ("Epikure" is a Registered Trade Mark of Shell; believed to be a condensation product of trimellitic anhydride and a diol) was mixed with an organic liquid or liquids (including ROH) as indicated in Table I to give a product 'X'.

TABLE I

| Example No. | Polyanhydride curing agent (parts) | 2-methoxy ethyl acetate (parts) | ROH (butyl glycolate) (parts) | Preparative conditions for product 'X' | Initial appearance/ nature of product 'X' |
|---|---|---|---|---|---|
| 1.1 | 40 | 60 | — | Mixed at ambient temp. (25° C.). | Inhomogeneous |
| 1.2 | 40 | 30 | 30 | | Inhomogeneous |
| 1.3 | 40 | 30 | 30 | Mixed & heated at 150° C. /1 hr. | Clear soln. |

29 parts of each of the three products 'X' of Table I were mixed with 150 parts of a solution of an epoxy resin solution 'Y' prepared by dissolving 40 parts of "Araldite" GT 6097 (a commercially available polyepoxide of epoxide equivalent 1700–2500: ("Araldite" is a Registered Trade Mark of Ciba-Geigy) in 60 parts of 2-ethoxy ethyl acetate to provide a lacquer.

The increase in viscosity with time of the lacquers X-Y prepared from the product 'X' and the solution 'Y' was determined according to Table 2.

TABLE 2

| Example No. | Viscosity (seconds DIN 4 mm viscosity cup at 20° C.) of lacquer X—Y | |
|---|---|---|
| | Initial | After 6 weeks at 40° C. |
| 1.4 | mixture inhomogeneous | mixture remains inhomogeneous |
| 1.5 | 92 | 371 |
| 1.6 | 99 | 154 |

The lacquer X-Y of Example 1.6 was spread onto tinplate by a roller coating method and cured in an oven for 12 minutes at 200° C. to produce a dried film of 10 micron thickness.

Adhesion of the film to the tinplate was shown to be excellent by the crosshatch/tape test, a test well established in the coatings industry.

The resistance of the film to solvents was good as indicated by its being able to withstand 40 double rubs with methylethyl ketone.

EXAMPLE 2

This Example illustrates the use of 2-ethoxyethanol as the compound ROH, instead of that used in Example 1, but the other components of the lacquer were the same.

Polyanhydride was mixed with organic liquids according to Table 3, to give a product 'X'.

TABLE 3

| Example No. | Polyanhydride curing agent (parts) | Organic Liquids | | Preparative conditions for product 'X' | Initial appearance/ nature of product 'X' |
|---|---|---|---|---|---|
| | | 2-methoxy ethyl acetate (parts) | ROH 2-ethoxy-ethanol (parts) | | |
| 2.1 | 40 | 60 | — | mixed at ambient temperature (25° C.) | Inhomogeneous |
| 2.2 | 40 | 39.5 | 20.5 | | Inhomogeneous |
| 2.3 | 40 | 39.5 | 20.5 | Mixed & Heated at 150° C. /2 hrs. | Clear soln. |

The increase in viscosity with time of lacquers X-Y prepared by mixing the products 'X' with solution 'Y' prepared as in Example 1 was determined according to Table 4.

TABLE 4

| Example No. | Viscosity (seconds DIN 4 mm viscosity cup at 20° C.) of lacquer X—Y | |
|---|---|---|
| | Initial | After 5 weeks at 40° C. |
| 2.4 | Remains inhomogeneous | |
| 2.5 | 79 | 201 |
| 2.6 | 94 | 99 |

The lacquer X-Y of 2.6 was spread onto tinplate by a roller coating method and cured in an oven for 12 minutes at 200° C. to produce a dried film of 10 micron thickness. Adhesion of the film to the substrate was excellent (crosshatch test) and the film withstood 40 double rubs using methylethyl ketone.

EXAMPLE 3

This Example illustrates the use of 2-ethylhexanol as another monohydroxy compound ROH. The other components remained the same as in Example 1.

Polyanhydride was mixed with organic liquids according to Table 5.

TABLE 5

| Example No. | Polyanhydride curing agent (parts) | Organic liquids | | Preparative conditions for product 'X' | Initial appearance/ nature of product 'X' |
|---|---|---|---|---|---|
| | | 2-methoxy ethyl acetate (parts) | ROH (2-ethyl hexanol) (parts) | | |
| 3.1 | 40 | 60 | — | mixed at ambient temperature (25° C.) | Inhomogeneous |
| 3.2 | 40 | 30.5 | 29.5 | | Inhomogeneous |
| 3.3 | 40 | 30.5 | 29.5 | Mixed & Heated at 150° C. /2 hrs. | clear soln. |

The increase in viscosity with time of lacquers X-Y prepared by mixing products 'X' with solutions 'Y' prepared as in Example 1 was determined according to Table 6.

TABLE 6

| Example No. | Viscosity (seconds DIN 4 mm cup at 20° C.) of lacquers X—Y | |
|---|---|---|
| | Initial | After 5 weeks at 40° C. |
| 3.4 | Remains inhomogeneous | |
| 3.5 | 105 | 165 |
| 3.6 | 111 | 128 |

A film prepared from the lacquer mixture X-Y of 3.6 as described in Example 1 had excellent adhesion and a solvent resistance of 50 double rubs using methylethyl ketone.

EXAMPLE 4

This Example illustrates the use of another monohydroxy compound ROH, n-butanol. The other components remained the same as in Example 1.

Polyanhydride was mixed with ogranic liquids according to Table 7.

TABLE 7

| Example No. | Polyanhydride curing agent (parts) | Organic Liquids | | Preparative conditions for product 'X' | Initial appearance/ Nature of product 'X' |
|---|---|---|---|---|---|
| | | 2-methoxy ethyl acetate (parts) | ROH (n-butanol) (parts) | | |
| 4.1 | 40 | 60 | — | mixed at ambient temperature (25° C.) | Inhomogeneous |
| 4.2 | 40 | 46.4 | 13.6 | | Inhomogeneous |
| 4.3 | 40 | 46.4 | 13.6 | Mixed & heated at 150° C. /1 hr. | clear soln. |

The increase in viscosity with time of lacquers X-Y prepared by mixing products 'X' with solutions 'Y' prepared as in Example 1 was determined according to Table 8.

TABLE 8

| Example No. | Viscosity (seconds DIN 4 mm cup at 20° C.) of lacquers X—Y | |
|---|---|---|
| | Initial | After 5 weeks at 40° C. |
| 4.4 | Remains inhomogeneous | |
| 4.5 | 79 | 160 |
| 4.6 | 92 | 106 |

A film prepared from the lacquer mixture X-Y of 4.3 as described in Example 1 had excellent adhesion and a solvent resistance of 70 double rubs using methylethyl ketone.

EXAMPLE 5

This Example illustrates the use of a polyanhydride, benzophenone tetracarboxylic acid dianhydride, which is different from that used in Examples 1 to 4, together with butylglycolate as the monohydroxy compound ROH.

Benzophenone tetracarboxylic acid dianhydride was mixed with organic liquids according to Table 9.

TABLE 9

| Example No. | Polyanhydride curing agent (parts) | Organic liquids | | Preparative conditions of 'X' | Initial appearance/ Nature of product X |
|---|---|---|---|---|---|
| | | 2-methoxy ethyl acetate (parts) | ROH (butylglycolate) (parts) | | |
| 5.1 | 40 | 60 | — | mixed at ambient temperature (25° C.) | Inhomogeneous |
| 5.2 | 40 | 22 | 38 | | Inhomogeneous |
| 5.3 | 40 | 22 | 38 | Heated at 150° C. /1 hr. | Clear soln. |

The increase in viscosity with time of lacquers X-Y prepared by mixing products 'X' with solutions 'Y' prepared as in Example 1 was determined according to Table 10:

TABLE 10

| Example No. | Viscosity (seconds DIN 4 mm cup at 20° C.) of lacquers X—Y | |
|---|---|---|
| | Initial | After 5 weeks at 40° C. |
| 5.4 | Remains inhomogeneous | |
| 5.5 | Remains inhomogeneous | |
| 5.6 | 124 | 172 |

A film prepared from the lacquer X-Y of 5.6 as described in Example 1 had excellent adhesion in the crosshatch test and a solvent resistance of 40 double rubs using methylethyl ketone.

EXAMPLE 6

This Example illustrates the use of a polyanhydride, butane—1,2,3,4,—tetracarboxylic dianhydride, which is different from that used in Examples 1 to 5, together with butyl glycolate as the compound ROH.

Butane—1,2,3,4—tetracarboxylic dianhydride was mixed with organic liquids as described in Example 1 and according to Table 11:

TABLE 11

| Example No. | Polyanhydride curing agent (parts) | Organic liquids | | Preparative conditions of 'X' | Initial appearance/ Nature of dispersed product 'X' |
|---|---|---|---|---|---|
| | | 2-methoxy ethyl acetate (parts) | ROH (butyl glycolate) (parts) | | |
| 6.1 | 19.3 | 80.7 | — | mixed at ambient temperature (25° C.) | Inhomogeneous |
| 6.2 | 19.3 | 50.7 | 30 | | Inhomogeneous |
| 6.3 | 19.3 | 50.7 | 30 | Mixed & heated at 160° C. /2 hrs. | clear soln. |

The increase in viscosity with time of lacquers X-Y prepared by mixing products 'X' with solutions 'Y' prepared as in Example 1 was determined according to Table 12:

TABLE 12

| Example No. | Viscosity (seconds DIN 4 mm cup at 20° C.) | |
|---|---|---|
| | Initial | After 5 weeks at 40° C. |
| 6.4 | Remains inhomogeneous | |
| 6.5 | Remains inhomogeneous | |
| 6.6 | 76 | 82 |

A film prepared from the lacquer X-Y of 6.6 as described in Example 1 had excellent adhesion in the crosshatch test and a solvent resistance of 40 double rubs using methylethyl ketone.

EXAMPLE 7

This Example illustrates the advantageous effects on the storage stability of lacquers prepared according to the invention in Examples 1 to 4 even in the presence of an accelerator, hexabutoxymethylmelamine the use of which is described in our copending application of the same date as the present application.

Experiments 1 to 4 were repeated but 0.5% by weight based on the weight of the total formulation of a commercially available hexabutoxymethylmelamine was added in each case:

| Experiment No. (referring to previous Example). | Viscosity (seconds DIN 4 mm cup at 20° C.) | |
|---|---|---|
| | Initial | After 2 weeks at 40° C. |
| 7/1.4 | Remains inhomogeneous | |
| 1.5 | 91 | 256 |
| 1.6 | 95 | 166 |
| 2.4 | Remains inhomogeneous | |
| 2.5 | 91 | 173 |
| 2.6 | 83 | 118 |
| 3.4 | Remains inhomogeneous | |
| 3.5 | 98 | 177 |
| 3.6 | 97 | 137 |
| 4.4 | Remains inhomogeneous | |
| 4.5 | 88 | 168 |
| 4.6 | 80 | 118 |

We claim:
1. A coating composition which comprises in admixture
   (a) a curing agent which is the reaction product of a polycarboxylic acid polyanhydride with a mono- hydroxy compound ROH, wherein R is alkyl, substituted alkyl, or aralkyl and (b) a solution of an epoxy resin which is to be cured.

2. A coating composition according to claim 1 wherein the acid polyanhydride curing agent is heated with the monohydroxy compound ROH to a temperature greater than 60° C. for such a period of time that at least 50% of the anhydride groups are reacted with ROH.

3. A coating composition according to claim 1 wherein the temperature is greater than 100° C.

4. A curing agent according to claim 1 wherein at least 75% of the anhydride groups have been reacted with ROH.

5. A coating composition according to claim 1 wherein ROH is selected from the group an alkanol, an ether alkanol and a hydroxy ester.

6. A coating composition according to claim 1 wherein the polyanhydride is an adduct of trimellitic anhydride and a polyhydric alcohol.

7. A coating composition according to claim 6 wherein the polyanhydride is an adduct of trimellitic anhydride and ethylene glycol.

8. A coating composition according to claim 1 wherein there is also present a solvent selected from the group ester solvents, ketone solvents and aromatic solvents.

9. A cured coating on a substrate which is prepared by applying to a substrate a coating composition according to claim 1 and thereafter heating the substrate.

* * * * *